No. 770,206.

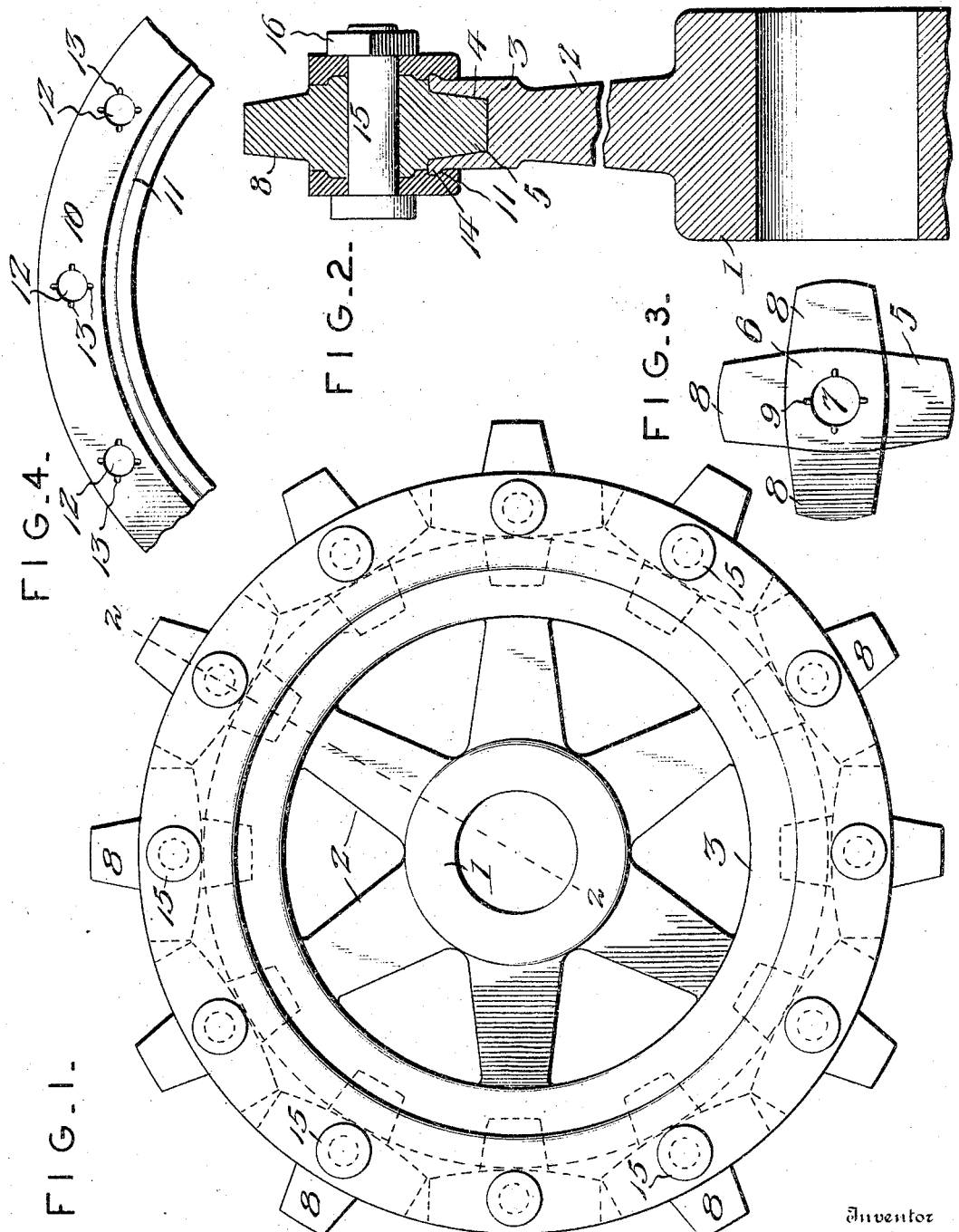

Patented September 13, 1904.

UNITED STATES PATENT OFFICE.

CHRISTIAN PETER WILHELMSEN, OF YAZOO CITY, MISSISSIPPI.

SPROCKET-WHEEL.

SPECIFICATION forming part of Letters Patent No. 770,206, dated September 13, 1904.

Application filed January 16, 1904. Serial No. 189,364. (No model.)

*To all whom it may concern:*

Be it known that I, CHRISTIAN PETER WILHELMSEN, a citizen of the United States, residing at Yazoo City, in the county of Yazoo and State of Mississippi, have invented new and useful Improvements in Sprocket-Wheels, of which the following is a specification.

My invention relates to new and useful improvements in sprocket-wheels; and its object is to provide a device of this character having teeth which are interchangeable and reversible, whereby the life of the sprocket can be lengthened without the necessity of replacing any of the parts.

A further object is to provide means for securely locking the detachable teeth upon the sprocket, so as to prevent accidental displacement thereof.

With the above and other objects in view the invention consists in providing a wheel having recesses in the periphery thereof at equal distances apart, and these recesses are adapted to receive the toothed portions of the sprocket. Each of these toothed portions is formed in a single piece of material and comprises a block from the sides of which project preferably four similar teeth. These toothed portions are secured to the wheel by means of rings clamped upon opposite faces thereof and upon the wheel.

The invention also consists in the further novel construction and combination of parts hereinafter more fully described and claimed, and illustrated in the accompanying drawings, showing the preferred form of my invention, and in which—

Figure 1 is a side elevation of a wheel constructed in accordance with my invention. Fig. 2 is a section on line 2 2, Fig. 1. Fig. 3 is a detailed view of one of the toothed portions, and Fig. 4 is an inner elevation of a portion of one of the rings.

Referring to the figures by numerals of reference, 1 is the hub of a wheel having integral spokes 2, which are connected to the rim 3. The periphery of the rim has recesses 4 therein, and each recess is adapted to receive a tooth 5, which extends from one side of a block 6. This block has an aperture 7 in the center thereof, and from the other edges of the block extend teeth 8, which are similar in size and form to the teeth 5, before referred to. Projections 9 are formed upon the faces of the blocks 6 at points adjacent the apertures 7. After the teeth 5 have been placed in the recesses 4 rings 10 are put in place at opposite sides of the rim 3. Each of these rings has a concentric groove 11 in its inner face and a series of apertures 12, which are adapted to register with the apertures 7 in the blocks 6. Recesses 13 are also provided adjacent the apertures 12 for the reception of the projections 9 on the blocks 6. Beads 14 are formed upon the sides of the rim 3 adjacent the periphery thereof, and these beads are adapted to project into the grooves 11 of the rings 10, and the projections 9 on the blocks 6 also become seated within the recesses 13. Bolts 15 are then inserted through the apertures 12 and 7 and are secured in place by means of nuts 16 or in any other suitable manner. The teeth on the rim 3 are so proportioned that when the blocks 6 are secured in position the laterally-extending teeth of the blocks will contact and form a practically-continuous surface between the rings 10.

It will be seen that by employing a sprocket of this character all of the wear thereon will be upon the peripheries of the rings 10 and upon the projecting teeth 8. Should the teeth become worn, they can be removed by first detaching the rings 10. The blocks 6 are then turned so as to bring one of the unused teeth into position beyond the peripheries of the rings 10, and said teeth can then be secured in place in the manner hereinbefore described. Should the rings 10 become worn by reason of the friction between them and the chain on the sprocket, they can be readily detached and new rings substituted. The projections 9 on the blocks 6 serve to assist the teeth 5 in holding the blocks against movement within the periphery of the wheel.

It will be seen that this device is extremely simple in construction, durable, and inexpensive, and by providing detachable wearing parts the life of the device can be prolonged indefinitely.

In the foregoing description I have shown the preferred form of my invention; but I do not limit myself thereto, as I am aware that modifications may be made therein without departing from the spirit or sacrificing any of the advantages thereof, and I therefore reserve the right to make such changes and alterations as fairly fall within the scope of my invention.

Having thus fully described my invention, what I claim as new, and desire to secure by Letters Patent, is—

1. In a sprocket, the combination with a wheel having recesses in the periphery thereof; of oppositely-disposed rings adapted to engage, and project beyond, the periphery, blocks upon the periphery and between the rings, said blocks having oppositely-extending teeth alining with the outer edges of the rings, and oppositely-extending teeth adapted to project into the recesses and beyond the peripheries of the rings, respectively, and means for securing the blocks between the rings.

2. In a sprocket, the combination with a wheel having recesses in the periphery thereof; of oppositely-disposed rings arranged at opposite sides and projecting beyond the periphery of the wheel, blocks interposed between and engaging the rings and bearing upon the periphery and having oppositely-arranged teeth located between the rings and alining with the peripheries thereof and oppositely-disposed teeth seated within the recesses and projecting beyond the rings, respectively, and means for binding the rings upon the blocks and wheel.

3. In a device of the character described, the combination with a wheel having beads upon the sides thereof and recesses in the periphery of the wheel; of blocks upon the periphery, there being teeth extending from opposite sides of the blocks, one tooth of each block being seated within one of the recesses, and projections upon each block, grooved rings at opposite sides of the wheel and blocks, the grooves of said rings being adapted to receive the aforesaid beads, said rings being also provided with recesses for the reception of the projections, and clamping devices extending through the rings and blocks.

CHRISTIAN PETER WILHELMSEN.

Witnesses:
S. R. BERRY,
JOHN ROEDU.